United States Patent
Harayama et al.

(10) Patent No.: US 12,403,648 B2
(45) Date of Patent: Sep. 2, 2025

(54) REPAIRING METHOD FOR SHAPED OBJECT, SHAPING SYSTEM, AND MANUFACTURING METHOD FOR ATTACHMENT MEMBER

(71) Applicant: MIMAKI ENGINEERING CO., LTD., Nagano (JP)

(72) Inventors: Kenji Harayama, Nagano (JP); Masayuki Furuse, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 127 days.

(21) Appl. No.: 18/167,883

(22) Filed: Feb. 12, 2023

(65) Prior Publication Data

US 2023/0256666 A1 Aug. 17, 2023

(30) Foreign Application Priority Data

Feb. 17, 2022 (JP) ................. 2022-023047

(51) Int. Cl.
*B29C 64/112* (2017.01)
*B29C 64/135* (2017.01)
(Continued)

(52) U.S. Cl.
CPC .......... *B29C 64/112* (2017.08); *B29C 64/135* (2017.08); *B29C 64/393* (2017.08);
(Continued)

(58) Field of Classification Search
CPC ... B29C 64/112; B29C 64/135; B29C 64/393; B29C 64/386; B29C 73/10; B33Y 10/00
See application file for complete search history.

(56) References Cited

U.S. PATENT DOCUMENTS

2017/0368770 A1* 12/2017 Harrier ................. B33Y 80/00
2020/0166907 A1* 5/2020 Frederick .............. B33Y 10/00
(Continued)

FOREIGN PATENT DOCUMENTS

JP 2003035021 2/2003
JP 2014025271 2/2014
(Continued)

OTHER PUBLICATIONS

"Notification of Reason for Rejection of Japan Counterpart Application", issued on Jun. 3, 2025, with English translation thereof, p. 1-p. 10.

*Primary Examiner* — Daniel McNally
(74) *Attorney, Agent, or Firm* — JCIPRNET

(57) ABSTRACT

A repairing method for a shaped object includes: preparing a defective portion part to be attached to a defective portion in a repair target shaped object; creating a repair patch which is an attachment member to be attached to at least one part of the repair target shaped object; and attaching the repair patch to cover at least one part of a boundary portion of the repair target shaped object and the defective portion part; where at least one part of the repair target shaped object is colored. The repair patch including a colored layer and an adhesive layer is created using a shaping device capable of shaping a shaped object colored by a layered shaping method, and the colored layer is colored and formed in accordance with a color of a portion covered by the repair patch in a shaped object.

5 Claims, 12 Drawing Sheets

(51) Int. Cl.
*B29C 64/393* (2017.01)
*B33Y 10/00* (2015.01)
*B33Y 40/20* (2020.01)
*B33Y 50/02* (2015.01)

(52) U.S. Cl.
CPC .............. *B33Y 10/00* (2014.12); *B33Y 40/20* (2020.01); *B33Y 50/02* (2014.12)

(56) References Cited

U.S. PATENT DOCUMENTS

2020/0307096 A1* 10/2020 Simonin ................. B29C 73/24
2021/0237337 A1* 8/2021 Zaldivar ................ B33Y 80/00

FOREIGN PATENT DOCUMENTS

| | | |
|---|---|---|
| JP | 2015071282 | 4/2015 |
| JP | 2019194004 | 11/2019 |

* cited by examiner

300

REPAIRING METHOD FOR SHAPED OBJECT, SHAPING SYSTEM, AND MANUFACTURING METHOD FOR ATTACHMENT MEMBER

CROSS REFERENCE TO RELATED APPLICATIONS

This application claims the priority benefit of Japanese Patent Application No. 2022-023047, filed on Feb. 17, 2022. The entirety of the above-mentioned patent application is hereby incorporated by reference herein and made a part of this specification.

TECHNICAL FIELD

The present disclosure relates to a repairing method for a shaped object, a shaping system, and a manufacturing method for an attachment member.

DESCRIPTION OF THE BACKGROUND ART

Conventionally, a shaping device (3D printer) for shaping a shaped object using an inkjet head is known (see e.g., Japanese Unexamined Patent Publication No. 2015-071282). In such a shaping device, for example, the shaped object is shaped through a layered shaping method by overlapping a plurality of ink layers formed by an inkjet head.

SUMMARY

In the case of a shaped object shaped by the shaping device, for example, even if the shaped object is damaged, the same shaped object can usually be shaped again. On the other hand, depending on the intended purpose of the shaped object and the manner of being damaged, it may be more desirable to repair the damaged shaped object than to re-shape the same shaped object. Furthermore, in this case, for example, it is conceivable to repair the shaped object by adhering the damaged area. However, when repairing the shaped object in this manner, for example, the strength at the repair position decreases, and thus the same area may be easily damaged again. Therefore, it is desired to repair the shaped object by a more appropriate method. The present disclosure provides a repairing method for a shaped object, a shaping system, and a manufacturing method for an attachment member.

The inventor of the present application conducted intensive research on a method for repairing a shaped object shaped by a shaping device. Then, the inventors have considered attaching a patch-shaped member (hereinafter, referred to as a repair patch) for reinforcement on at least one part of the periphery of the damaged area rather than simply performing adhering on the damaged area. However, in this case, it is conceivable that the appearance of the shaped object after repair is deteriorated by the repair patch remaining on the surface of the shaped object after the repair. In particular, when repairing the shaped object in which the surface is colored by such a method, the appearance may be greatly deteriorated. On the other hand, the inventor of the present application considered creating a repair patch in accordance with the repair position in the shaped object to be repaired by further intensive research. Furthermore, in this case, the inventor considered creating a repair patch in a state of being colored in accordance with the repair position in the shaped object to be repaired using a shaping device capable of shaping the shaped object same as or similar to the shaped object to be repaired. According to such configuration, for example, the strength of the shaped object after the repair can be appropriately increased by using the repair patch. Furthermore, for example, the repair patch attached to the shaped object can be appropriately prevented from being excessively conspicuous by using the repair patch colored in accordance with the repair position. Furthermore, for example, the colored repair patch corresponding to the repair position can be easily and appropriately created by creating the repair patch using the shaping device.

Through further thorough research, the inventor of the present application found features necessary for obtaining such effects and contrived the present disclosure. In order to solve the above problem, the present disclosure provides a repairing method for a shaped object for repairing a shaped object shaped by a shaping device, the method including a preparing stage of preparing a defective portion part which is a member to be attached to a defective area in a repair target shaped object which is the shaped object where a damage in which one part is defected has occurred; an attachment member creating stage of creating an attachment member which is a member to be attached to at least one part of surfaces of the repair target shaped object and the defective portion part; and an attaching stage of attaching the attachment member so as to cover at least one part of a boundary portion between the repair target shaped object and the defective portion part in a state where the repair target shaped object and the defective portion part are brought into contact with each other; where at least one part of a surface of the repair target shaped object is colored; in the attachment member creating stage, the attachment member including an adhesive layer which is a layer for adhering the attachment member to the repair target shaped object and the defective portion part, and a colored layer which is a layer subjected to coloring is created using a shaping device capable of shaping the shaped object colored by a layered shaping method; and a colored layer is colored and formed according to a color of a portion covered by the attachment member in the repair target shaped object.

When configured in such manner, for example, the strength of the repair target shaped object after repair can be appropriately enhanced by attaching the attachment member to at least one part of the repair position in the repair target shaped object. Furthermore, by using the attachment member including the colored layer and the adhesive layer, for example, the shaping device can easily and appropriately create an attachment member that is appropriately colored and can be adhered to the repair target shaped object. Furthermore, by coloring and forming the colored layer of the attachment member in accordance with the color of the portion covered by the attachment member in the repair target shaped object, for example, the attachment member can be appropriately prevented from being excessively conspicuous in the repair target shaped object after the repair. Thus, according to such configuration, for example, the repair on the repair target shaped object can be easily and appropriately carried out.

In this configuration, for example, it is conceivable to use a patch-shaped member (repair patch) as the attachment member. According to such configuration, for example, the attachment member can be easily and appropriately attached to the correction target shaped object. It is conceivable to use, for example, a portion or the like deviated from the correction target shaped object due to damage can be considered as a defective portion part. With this configuration, for example, the defective portion part can be easily and appropriately prepared. In this case, for example, a portion excluding the defective portion part from the shaped object before the damage can be considered as a repair target shaped object. The repair target shaped object can be considered as, for example, a configuration corresponding to at least one part of the shaped object of before the damage occurs. Furthermore, depending on the state of damage, the quality required for repair, and the like, consideration is made to use a part newly created for repair instead of one part of the shaped object before the damage occurred as the defective portion part. In this case, for example, consideration is made to further create (shape) the defective portion part with the shaping device used for creating the attachment member. Furthermore, the repairing method for the shaped object preferably further includes, for example, an adhering stage of adhering the defective portion part to the repair target shaped object. In this case, it is conceivable to perform the operation of the attaching stage after performing the operation of the adhering stage. According to such configuration, for example, the defective portion part can be more appropriately fixed to the repair target shaped object.

Furthermore, the repairing method for the shaped object preferably further includes, for example, a repair position designating stage of receiving designation of a repair position, which is a position to be repaired in the repair target shaped object, from the user. In this case, in the repair position designating stage, for example, an image showing at least one part of the repair target shaped object is displayed on the image display device, and the designation of the repair position is received from the user. In the attachment member creating stage, for example, the shape of the attachment member and the color of each position in the colored layer are determined in accordance with the repair position designated in the repair position designating stage. Furthermore, the attachment member is created based on the determined shape and color. With this configuration, for example, the attachment member adapted to the repair position can be more appropriately created based on the designation of the user.

Furthermore, in the attachment member creating stage, for example, it is conceivable to create the attachment member based on the data used at the time of shaping the repair target shaped object. In this case, the time of shaping the repair target shaped object can be considered as, for example, the time of shaping at which the shaped object before the damage occurs is shaped by the shaping device. Furthermore, for example, consideration is made to use shaped object data indicating the shape and color of the shaped object as such data. More specifically, in this case, in the attachment member creating stage, for example, the color of each position in the colored layer of the attachment member is determined based on the shaped object data used at the time of shaping the repair target shaped object, the data indicating the shape and color of the repair target shaped object. Furthermore, the attachment member is created based on the determined color. According to such configuration, for example, the color of the portion covered by the attachment member in the repair target shaped object can be appropriately acquired based on the shaped object data. Thus, for example, the colored layer of the attachment member can be appropriately colored in accordance with the color of the portion covered by the attachment member in the repair target shaped object.

Furthermore, for example, consideration is made to directly acquire the color of the portion covered by the attachment member in the repair target shaped object from the repair target shaped object without using the shaped object data. In this case, the repairing method for the shaped object further includes, for example, a data generating stage of generating scan data which is data obtained by 3D scanning the repair target shaped object. In this case, in the attachment member creating stage, for example, the color of each position in the colored layer of the attachment member is determined based on the scan data generated in the data generating stage. Furthermore, the attachment member is created based on the determined color. Even when configured in such manner, for example, the color of the portion covered by the attachment member in the repair target shaped object can be appropriately acquired. Thus, for example, the colored layer of the attachment member can be appropriately colored in accordance with the color of the portion covered by the attachment member in the repair target shaped object. Furthermore, in the data generating stage, for example, it is conceivable to have the defective portion part as a scan target. More specifically, in this case, for example, it is conceivable to carry out the 3D scan in a state where the defective portion part is attached to the repair target shaped object. According to such configuration, for example, the color of the portion covered by the attachment member in the repair target shaped object and the defective portion part can be appropriately acquired. Thus, for example, the color of each position of the colored layer of the attachment member can be more appropriately determined.

Furthermore, in this configuration, the repair target shaped object includes, for example, a region to be colored subjected to coloring at a surface of the repair target shaped object, and a light reflecting region formed on an inner side of the region to be colored in a light reflecting manner. As the shaping device used in the attachment member creating stage, it is conceivable to use a device capable of shaping such a shaped object. More specifically, as the shaping device used in the attachment member creating stage, for example, it is conceivable to use a device that ejects an ultraviolet-curable material as the shaping material. In this case, the shaping device includes, for example, a plurality of ejection heads each of which ejects the shaping material, and an ultraviolet light source that irradiates the ejected shaping material with ultraviolet light. Furthermore, the plurality of ejection heads include at least a coloring material head that ejects a color material which is the colored shaping material for coloring, and a light reflective material head that ejects a light reflective material which is the shaping material having light reflectivity. According to such configuration, for example, the attachment member having a configuration adapted to the repair target shaped object can be appropriately created.

Furthermore, in this case, the ultraviolet-curable material used as the shaping material can be brought to a state having adhesiveness, for example, by being irradiated with the ultraviolet light of a smaller amount of light than when being completely cured. In this case, it is conceivable to form the adhesive layer of the attachment member by bringing the shaping material into such a state having adhesiveness. More specifically, in this case, in the attachment member creating stage, for example, the colored layer is formed using at least the color material ejected from the coloring material head. It is conceivable to form the colored layer by, for example, emitting a sufficient amount of ultraviolet light to cure the shaping material to a state not having adhesiveness. Furthermore, in this case, it is conceivable to form the adhesive layer using the shaping material ejected from any of the plurality of ejection heads. In addition, at the time of forming the adhesive layer, it is conceivable to increase the viscosity of the shaping material to a state having adhesiveness by irradiating the shaping material with ultraviolet light from an ultraviolet light source. Furthermore, in this case, for example, it is conceivable to cure the shaping material in the adhesive layer by further irradiating the attachment member with the ultraviolet light after attaching the attachment member to the repair target shaped object in the attaching stage. According to such configuration, for example, the adhesive layer of the attachment member can be appropriately formed using the ultraviolet-curable shaping material. Furthermore, the attachment member can be appropriately fixed to the repair target shaped object by further emitting the ultraviolet light after attaching the attachment member to the repair target shaped object to complete the curing of the adhesive layer.

Furthermore, in a modified example of the manner of forming the adhesive layer of the attachment member, consideration is also made to form the adhesive layer with an adhesive material that is not used as a shaping material at the time of shaping a normal shaped object. In this case, the material not used as the shaping material at the time of shaping the normal shaped object can be considered as, for example, a material not used when shaping the same shaped object as the repair target shaped object. The adhesive material is, for example, a material of the adhesive layer in the attachment member, and can also be considered as a material or the like that is not used when forming the same region as each of the region to be colored and the light reflecting region in the repair target shaped object. Furthermore, in this case, the shaping device used to create the attachment member further includes, for example, an adhesive material head that ejects the adhesive material. In the attachment member creating stage, for example, the colored layer is formed using at least the color material ejected from the coloring material head. Then, an adhesive layer is formed using the adhesive material ejected from the adhesive material head. Even when configured in such manner, the attachment member including the colored layer and the adhesive layer can be appropriately created. As such an adhesive material, for example, it is conceivable to use an ultraviolet-curable material or the like that maintains adhesiveness even when ultraviolet light is sufficiently emitted and curing is completed. More specifically, as such an adhesive material, for example, it is conceivable to use a liquid same as or similar to a known ultraviolet-curable ink (primer ink) for forming a base. Furthermore, for example, consideration is made to use an adhesive material that is not ultraviolet curable, and the like for the adhesive material that is not used as the shaping material at the time of shaping the normal shaped object. When using such an adhesive material, for example, it is conceivable to complete the attachment of the attachment member to the repair target shaped object without further emitting the ultraviolet light in the attaching stage. Even when configured in such manner, for example, the attachment member can be appropriately attached to the repair target shaped object.

Furthermore, as a configuration of the present disclosure, it is conceivable to use a shaping system, a manufacturing method for an attachment member, and the like having the features similar to the above. In this case as well, for example, effects similar to the above can be obtained.

According to the present disclosure, for example, repair of a damaged shaped object can be easily and appropriately carried out.

BRIEF DESCRIPTION OF THE DRAWINGS

FIG. 1A shows one example of a configuration of the shaping system 10.

FIG. 1B shows one example of a configuration of a main part of a shaping device 12 in the shaping system 10.

FIG. 1C illustrates an example of a configuration of a head unit 102.

FIG. 2A shows one example of a configuration of the shaped object 50. FIG. 2B shows one example of how damage occurs in the shaped object 50. FIG. 2C illustrates an example of a configuration of the repair patch 300.

FIGS. 3A and 3B illustrate an example of a configuration of the repair patch 300. FIG. 3C illustrates an example of a manner of attaching the repair patch 300 to the shaped object 50 to be repaired. FIG. 3D is a cross-sectional view showing an example of a configuration of a cross-section of the shaped object 50 and the repair patch 300 at a position of attaching the repair patch 300.

FIGS. 6A and 6B illustrate a modified example of the configuration of the repair patch 300. FIG. 6C illustrates a modified example of the configuration of the head unit 102 in the shaping device 12.

DETAILED DESCRIPTION OF EMBODIMENTS

Figure 1A:
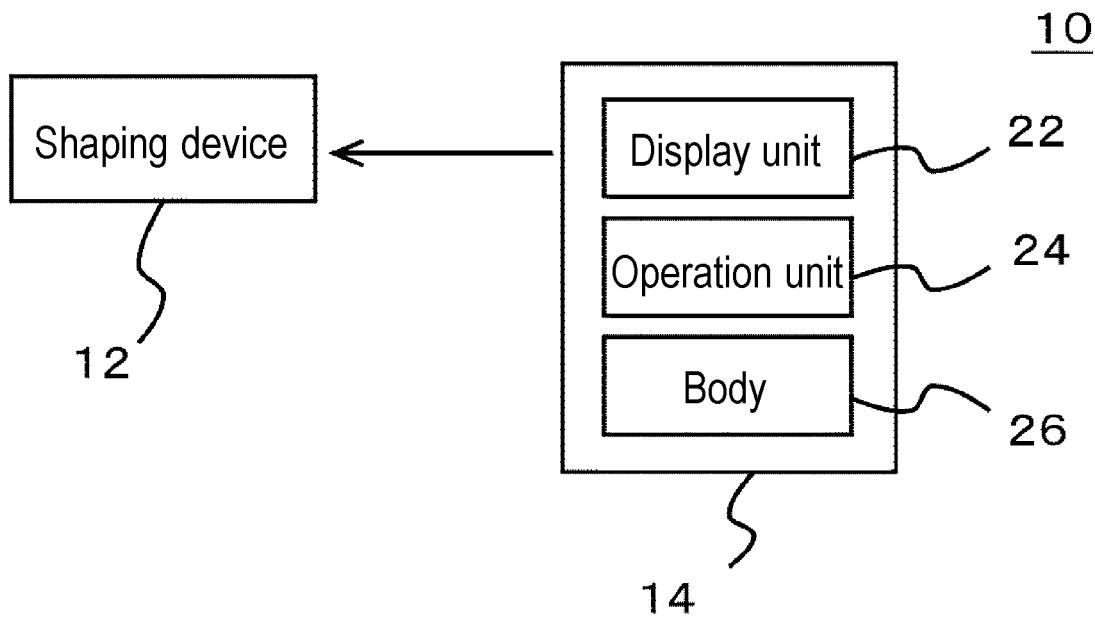
FIGS. 1A to 1C are views describing a shaping system 10 used in a repairing method for a shaped object according to one embodiment of the present disclosure.
Figure 1B:
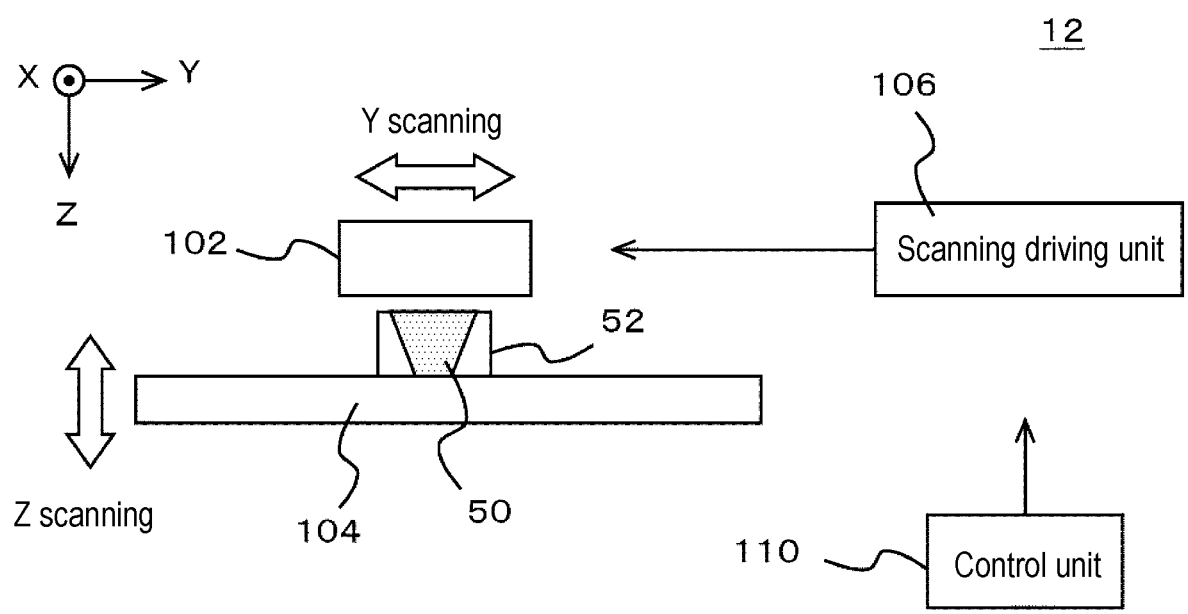
Figure 1C:
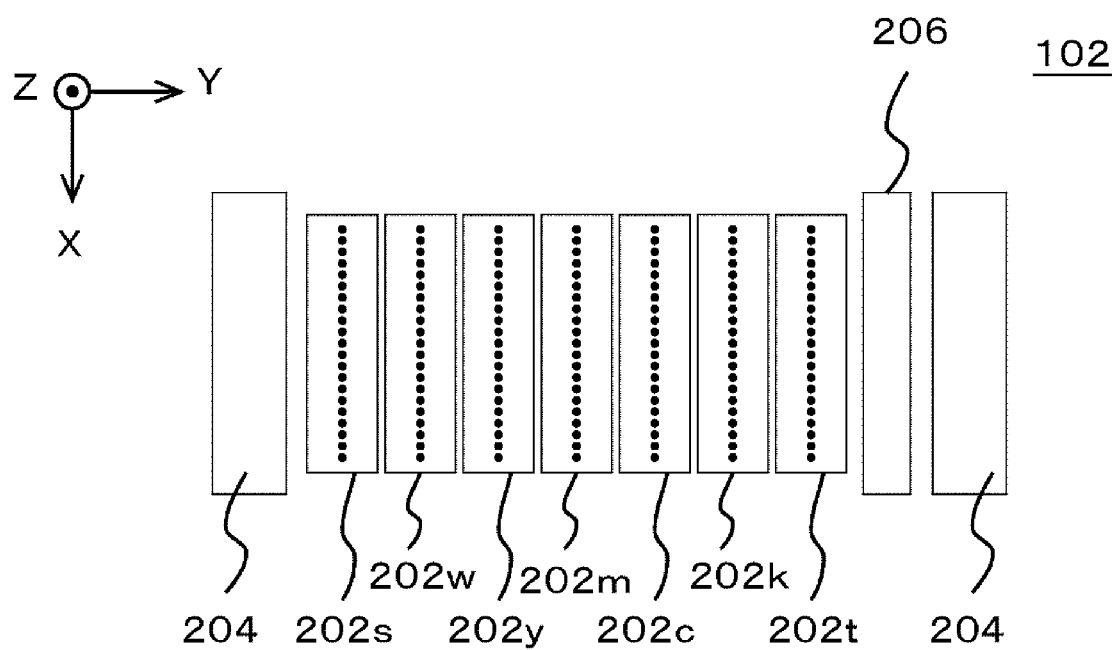

Hereinafter, an embodiment according to the present disclosure will be described with reference to the drawings. FIGS. 1A to 1C are views describing a shaping system 10 used in a repairing method for a shaped object according to one embodiment of the present disclosure. FIG. 1A illustrates an example of a configuration of the shaping system 10. FIG. 1B shows an example of a configuration of a main part of a shaping device 12 in the shaping system 10. In the present example, the shaping system 10 is a shaping system for shaping a stereoscopic shaped object, and includes a shaping device 12 and a control PC 14. The shaped object shaped in the shaping system 10 can be considered as, for example, a stereoscopic three-dimensional structure. Furthermore, in the present example, the shaping system 10 is configured by a plurality of devices, the shaping device 12 and the control PC 14. In a modified example of the shaping system 10, the shaping system 10 may be configured by a single device. In this case, for example, it is conceivable to configure the shaping system 10 with a single shaping device 12 also having the function of the control PC 14. The shaping system 10 may further include devices other than the shaping device 12 and the control PC 14.

In the shaping system 10, the shaping device 12 is a device that executes shaping of a shaped object, and shapes a shaped object according to the control of the control PC 14. In the present example, the shaping device 12 is a full-color shaping device capable of shaping a shaped object colored in full color, and receives shaped object data, which is data indicating a shaped object to shape, from the control PC 14, and shapes the shaped object based on the shaped object data. Furthermore, the shaping device 12 is a shaping device (3D printer) that shapes a stereoscopic shaped object 50 through a layered shaping method, and for example, as shown in FIG. 1B, includes a head unit 102, a shaping table 104, a scanning driving unit 106, and a control unit 110. In this case, the layered shaping method can be considered as, for example, a method of shaping the shaped object 50 by overlapping layers formed of the shaping material. Other than the points described below, the shaping device 12 may have a structure identical or similar to a known shaping device. More specifically, other than the points described below, the shaping device 12 may have a feature identical or similar to a known shaping device that carries out shaping by ejecting a droplet to become the material of the shaped object 50 using an inkjet head.

Furthermore, other than the illustrated configuration, the shaping device 12 may further include, for example, various types of configurations necessary for the shaping, and the like of the shaped object 50.

The head unit 102 has a configuration that ejects the material of the shaped object 50. In the present example, ink is used as the material of the shaped object 50. For example, the ink can be considered as a functional liquid or the like. Moreover, in the present example, for example, the ink can be considered as liquid, and the like ejected from the inkjet head. More specifically, the head unit 102 ejects ink that cures according to predetermined conditions from a plurality of inkjet heads as a material of the shaped object 50. Then, by curing the ink after landing, the respective layers forming the shaped object 50 are formed in an overlapping manner, and a shaped object is shaped through the layered shaping method. Moreover, in the present example, an ultraviolet-curable ink (UV ink) that cures from a liquid state by irradiation of ultraviolet light is used as the ink. In this case, the ultraviolet-curable ink is an example of an ultraviolet curable shaping material. Furthermore, the head unit 102 further ejects a material of a support layer 52 in addition to the material of the shaped object 50. The head unit 102 thereby forms the support layer 52 at a periphery of the shaped object 50, and the like as necessary.

The support layer 52 can be considered as, for example, a layered structural object that supports at least one part of the shaped object 50 being shaped. The support layer 52 is formed as necessary at the time of shaping the shaped object 50 and removed after the shaping is completed.

The shaping table 104 is a table-shaped member that supports the shaped object 50 being shaped and is disposed at a position facing the inkjet head in the head unit 102, and has the shaped object 50 being shaped and the support layer 52 placed on the upper surface thereof. Furthermore, in the present example, the shaping table 104 has a configuration of being movable in a layering direction (Z direction in the figure), and moves in the layering direction in accordance with the progress of the shaping of the shaped object 50 by being driven by the scanning driving unit 106. In this case, the layering direction can be considered as, for example, the direction in which the shaping materials are layered in the layered shaping method. More specifically, in the present example, the layering direction is a direction orthogonal to the main scanning direction (Y direction in the figure) and the sub scanning direction (X direction in the figure) preset in the shaping device 12.

The scanning driving unit 106 is a driving unit that causes the head unit 102 to perform a scanning operation of relatively moving with respect to the shaped object 50 being shaped. In the present example, relatively moving with respect to the shaped object 50 being shaped can be considered as, for example, relatively moving with respect to the shaping table 104, and the like. Furthermore, causing the head unit 102 to perform the scanning operation can be considered as, for example, causing the inkjet head of the head unit 102 to perform the scanning operation, and the like. In addition, in the present example, the scanning driving unit 106 causes the head unit 102 to perform the main scan (Y scanning), the sub scan (X scanning), and the layering direction scan (Z scanning) as the scanning operation. In this case, the main scan can be considered as, for example, an operation of ejecting the ink while relatively moving in the main scanning direction with respect to the shaped object 50 being shaped. The sub scan can be considered as, for example, an operation of relatively moving with respect to the shaped object 50 being shaped in the sub-scanning direction orthogonal to the main scanning direction. Furthermore, the sub scan can be considered as, for example, an operation of relatively moving with respect to the shaping table 104 in the sub-scanning direction by a preset feed amount, or the like. In the present example, the scanning driving unit 106 causes the head unit 102 to form a layer of ink by causing the head unit 102 to perform the main scan and the sub scan. Furthermore, the layering direction scan can be considered as, for example, an operation of relatively moving in the layering direction with respect to the shaped object 50 being shaped. The scanning driving unit 106 adjusts the relative position of the inkjet head with respect to the shaped object 50 being shaped in the layering direction by causing the head unit 102 to perform the layering direction scan in accordance with the progress of the shaping operation.

The control unit 110 has a configuration including, for example, a CPU of the shaping device 12, and controls the shaping operation of the shaped object 50 by controlling each unit of the shaping device 12. Furthermore, in the present example, the control unit 110 generates slice data, which is data indicating a cross-section of the shaped object 50 to shape, based on the shaped object data received from the control PC 14. Then, in the operation of forming each layer of ink configuring the shaped object 50, each inkjet head is caused to eject ink used for shaping the shaped object by controlling the operation of each inkjet head in the head unit 102 based on the slice data. According to the present example, for example, the shaping of the shaped object 50 can be appropriately executed.

Furthermore, in the present example, the shaping device 12 further creates a repair patch, which is a member used for repairing the shaped object, other than the normal shaped object. In this case, the normal shaped object can be considered as, for example, a shaped object or the like shaped in the shaping device 12 by the normal shaping operation.

Furthermore, the repair patch can be considered as, for example, a member or the like used when repairing a shaped object shaped in the past by the shaping device 12 that creates the repair patch or another shaping device. In the present example, the operation of creating a repair patch, the manner of using the repair patch, and the like will be described in more detail later.

Furthermore, in the shaping system 10, the control PC 14 is a computer (host PC) that controls the operation of the shaping device 12, and controls the shaping operation by the shaping device 12 by providing the shaped object data to the shaping device 12. Furthermore, in the present example, the control PC 14 includes the display unit 22, the operation unit 24, and the body 26, and supplies shaped object data indicating a shaped object in which coloring is performed on a surface where hue can be visually recognized from the outside to the shaping device 12. The display unit 22 is an example of an image display device, and displays various types of information to the user of the control PC 14. The display unit 22 can be considered as, for example, a configuration corresponding to a monitor of a computer. The operation unit 24 is configured to receive an input of information from the user by receiving an operation of the user. The operation unit 24 can be considered as, for example, a configuration corresponding to an input device such as a mouse or a keyboard of a computer. The body 26 is configured to execute various processes in the control PC 14. The body 26 can be considered as, for example, a configuration corresponding to a body portion of a computer.

Furthermore, in the present example, the control PC 14 is an example of a control device that controls the operation of the shaping device 12, and for example, provides shaped object data received from the outside of the shaping system 10 to the shaping device 12. According to such configuration, for example, the shaped object data can be appropriately provided to the shaping device 12. Thus, the shaping of the shaped object can be appropriately executed in the shaping system 10. In this case, for example, the control PC 14 may perform adjustment, and the like according to the configuration, state, and the like of the shaping device 12 on the shaped object data received from the outside, and provide the same to the shaping device 12. Furthermore, in the present example, when creating a repair patch in the shaping device 12, the control PC 14 provides shaped object data indicating the repair patch to the shaping device 12. According to such configuration, for example, the shaping device 12 can be caused to appropriately create the repair patch. Furthermore, for example, the shaped object data may be generated in the control PC 14 according to, for example, an instruction, an operation, or the like of the user instead of being received from the outside of the shaping system 10.

For example, when causing the shaping device 12 to create a repair patch, consideration is made to generate shaped object data indicating the repair patch in the control PC 14, and the like. Even when configured in such manner, for example, the shaped object data can be appropriately provided to the shaping device 12.

Next, a configuration of the head unit 102 in the shaping device 12 will be described in more detail. FIG. 1C illustrates an example of a configuration of the head unit 102. In the present example, the head unit 102 includes a plurality of inkjet heads 202, a plurality of ultraviolet light sources 204, and a flattening roller 206. The plurality of inkjet heads 202 include an inkjet head 202s, an inkjet head 202w, an inkjet head 202y, an inkjet head 202m, an inkjet head 202c, an inkjet head 202k, and an inkjet head 202t, as shown in a distinguished manner with letters s to t in the figure. The plurality of inkjet heads 202 are, for example, arranged side by side in the main scanning direction with their positions in the sub scanning direction aligned. Furthermore, each inkjet head 202 includes a nozzle row, in which a plurality of nozzles are lined in a predetermined nozzle row direction, on a surface facing the shaping table 104. Moreover, in the present example, the nozzle row direction is a direction parallel to the sub scanning direction.

Among these inkjet heads 202, the inkjet head 202s is an inkjet head that ejects the material of the support layer 52. For example, a known material for the support layer can be suitably used for the material of the support layer 52. The inkjet head 202 other than the inkjet head 202s is an inkjet head that ejects the material of the shaped object 50. Furthermore, in the present example, the inkjet head 202 other than the inkjet head 202s can be considered as, for example, an example of an ejection head that ejects the shaping material configuring the shaped object 50. Furthermore, among the inkjet heads 202 other than the inkjet head 202s, the inkjet head 202w is an inkjet head that ejects white (W color) ink. Moreover, in the present example, the inkjet head 202w is an example of a light reflective material head that ejects a light reflective material, which is a shaping material having light reflectivity. The white ink is an example of a light reflective material, and is used, for example, when forming a region (light reflecting region) having a property of reflecting light in the shaped object 50. For example, the light reflecting region reflects light entering from the outside of the shaped object 50 when performing coloring with full color representation on the surface of the shaped object 50. In this case, the full color representation can be considered as, for example, representation of colors performed with a possible combination of the subtractive color mixing method using the inks of process colors. The process color can be considered as, for example, a basic color used for color representation. The inkjet head 202y, the inkjet head 202m, the inkjet head 202c, and the inkjet head 202k (hereinafter referred to as the inkjet heads 202y to 202k) are inkjet heads for coloring used at the time of shaping the colored shaped object 50. More specifically, the inkjet head 202y ejects ink of yellow color (Y color). The inkjet head 202m ejects ink of magenta color (M color). The inkjet head 202c ejects ink of cyan color (C color). The inkjet head 202k ejects ink of black color (K color). Furthermore, in the present example, the inkjet heads 202y to 202k are an example of a coloring material head that is an ejection head that ejects a colored material. In this case, the color material can be considered as, for example, a colored shaping material for coloring used at the time of shaping the colored shaped object. Each color of YMCK is an example of a process color. The ink of each color of Y, M, C, and K is an example of a color material. The ink of each color of Y, M, C, and K can be considered as, for example, a color ink for coloring. The inkjet head 202t is an inkjet head that ejects a clear ink. The clear ink can be considered as, for example, an ink colorless and transparent (T) with respect to visible light. Furthermore, the clear ink can be considered as, for example, an ink to which a coloring material is not intentionally added.

The plurality of ultraviolet light sources 204 are light sources (UV light sources) for curing ink, and generate an ultraviolet light that cures the ultraviolet-curable ink. The ultraviolet light source 204 can also be considered as, for example, a light source that irradiates the shaping material after ejected by the plurality of inkjet heads 202 in the shaping device 12 with the ultraviolet light. Moreover, in the present example, each of the plurality of ultraviolet light sources 204 is disposed on one end side and the other end side in the main scanning direction in the head unit 102 so as to sandwich the inkjet heads 202 in between. For example, UVLED (ultraviolet LED) and the like can be suitably used for the ultraviolet light source 204. Furthermore, it is also conceivable to use a metal halide lamp, a mercury lamp, and the like for the ultraviolet light source 204. The flattening roller 206 is a flattening unit for flattening the layer of ink formed during the shaping of the shaped object 50. The flattening roller 206 can also be considered as, for example, a configuration for flattening a layer formed of a material ejected from the ejection head. Furthermore, in the present example, the flattening roller 206 flattens the layer of ink by coming into contact with the surface of the layer of ink at the time of the main scan and removing one part of the ink before curing. The layer of ink forming the shaped object 50 can be appropriately formed, for example, by using the head unit 102 having the above configuration. Furthermore, for example, the shaped object 50 can be appropriately shaped by forming a plurality of layers of ink in an overlapping manner.

The specific configuration of the head unit 102 is not limited to the configuration described above and can be variously modified. For example, the head unit 102 may further include an inkjet head for colors other than the above as an inkjet head for coloring. Furthermore, the arrangement of a plurality of inkjet heads in the head unit 102 can be variously modified. For example, the positions in the sub scanning direction of some inkjet heads may be shifted from the other inkjet heads.

Figure 2A:
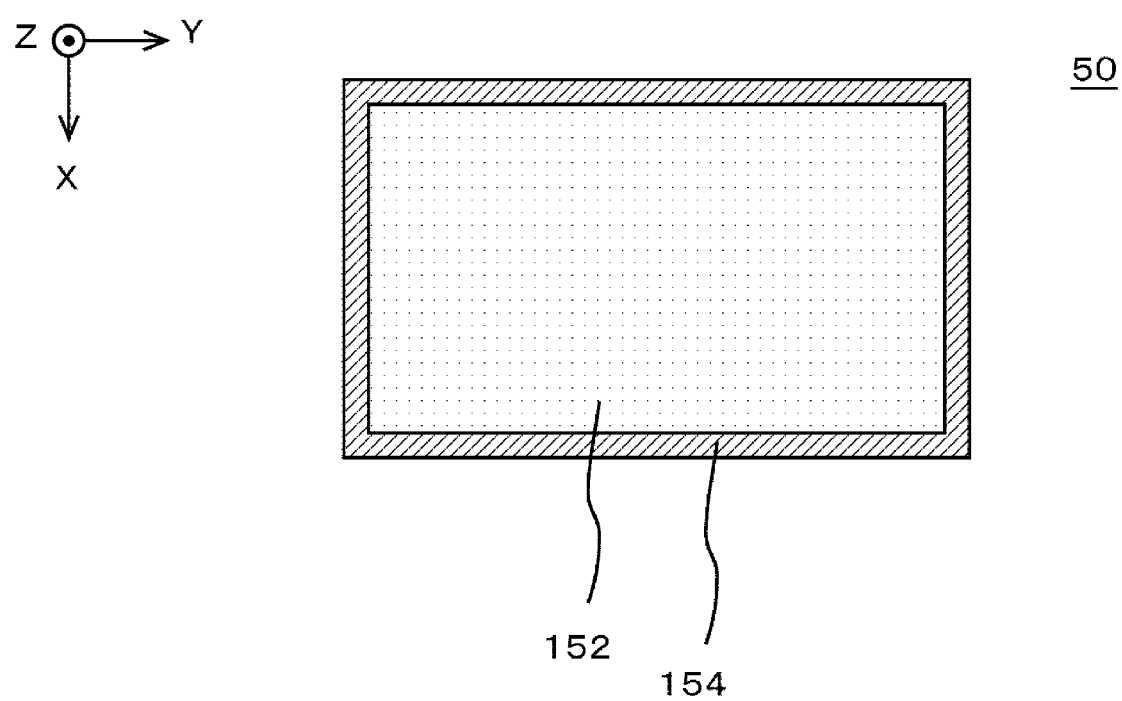
FIGS. 2A to 2C are views describing a shaped object 50 shaped by the shaping device 12 of the present example and an operation of repairing the shaped object 50.
Figure 2B:
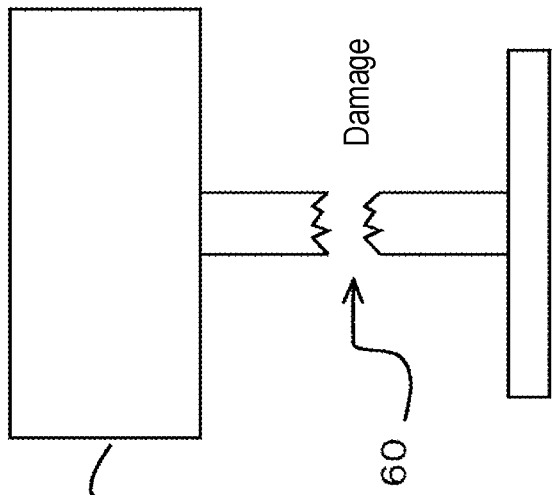
Figure 2B:
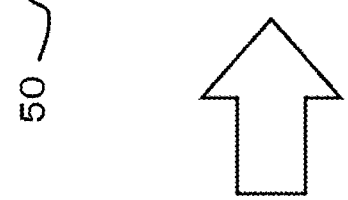
Figure 2B:
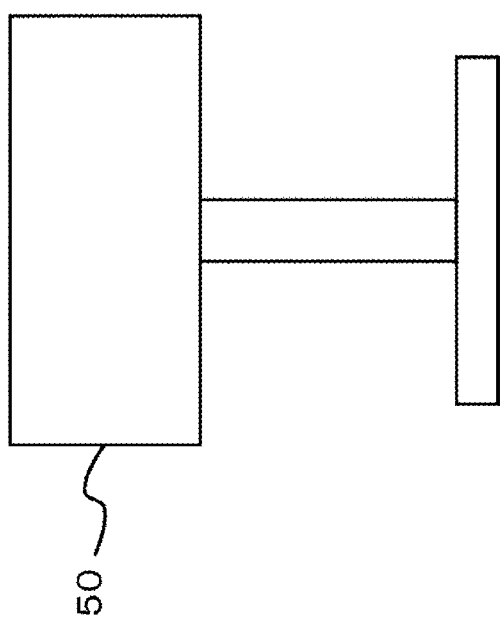
Figure 2C:

Next, the configuration of the shaped object 50 shaped by the shaping device 12 of the present example, the operation of repairing the shaped object 50 using the repair patch, and the like will be described in more detail. FIGS. 2A to 2C are views describing the shaped object 50 to be shaped by the shaping device 12 of the present example and the operation of repairing the shaped object 50. FIG. 2A is a view showing one example of the configuration of the shaped object 50, and shows one example of the configuration of an X-Y cross section, which is a cross section of the shaped object 50 orthogonal to the layering direction (Z direction). In this case, the configuration of the Y-Z cross-section and the X-Z cross-section of the shaped object 50 perpendicular to the X direction and the Y direction also have a similar region.

As described above, in the present example, the shaping device 12 (see FIGS. 1A to 1C) shapes the shaped object 50 in which at least the surface is colored using the inkjet heads 202$y$ to 202$k$ (see FIGS. 1A to 1C) and the like. In this case, it can be considered that when referring to the surface of the shaped object 50 being colored, this means that, for example, at least one part of the region where hue can be visually recognized from the outside in the shaped object 50 is colored. Furthermore, in this case, the shaping device 12 shapes the shaped object 50 including a light reflecting region 152 and a region to be colored 154, as shown in the figure. Moreover, the support layer 52 (see FIGS. 1A to 1C) is formed at the periphery of the shaped object 50, and the like, as necessary.

The light reflecting region 152 is a region formed on the inner side of the region to be colored 154 in a light reflecting manner, and reflects light entering from the outer side of the shaped object 50 through the region to be colored 154. In the present example, the shaping device 12 forms the light reflecting region 152 inside the shaped object 50 using white ink ejected from the inkjet head 202$w$ (see FIGS. 1A to 1C). In this case, the light reflecting region 152 can be considered as, for example, a region also serving as an inner region. The inner region can be considered as, for example, a region configuring the inside of the shaped object 50. In the modified example of the shaped object 50, the inner region may be formed as a region different from the light reflecting region 152. In this case, the shaping device 12 forms the inner region using, for example, an arbitrary ink other than the material of the support layer 52. In addition, the light reflecting region 152 is formed at the periphery of the inner region. The region to be colored 154 is a region colored by inks for coloring ejected from the inkjet heads 202$y$ to 202$k$ at the surface of the shaped object 50. In the present example, the shaping device 12 uses the ink for coloring ejected from the inkjet heads 202$y$ to 202$k$ and the clear ink ejected from the inkjet head 202$t$ (see FIGS. 1A to 1C) to form the region to be colored 154 at the periphery of the light reflecting region 152. In this case, in the shaping device 12, for example, various colors are represented by adjusting the ejection amount of the ink for coloring of each color to each position. Furthermore, the clear ink is used to compensate for a change in the amount of ink for coloring caused by the difference in color. According to such a configuration, for example, each position of the region to be colored 154 can be appropriately colored with a desired color. This also makes it possible, for example, to appropriately shape a colored shaped object 50.

Here, after shaping the shaped object 50 in the shaping device 12, various damages may occur in the shaped object 50. For example, as in the shaped object 50 having the configuration shown in FIG. 2B, in the case of the shaped object 50 in which a portion thinner than other areas exist, damage easily occurs at the thin portion. FIG. 2B is a view showing one example of how damage occurs in the shaped object 50, and shows one example of a state in which the damage occurs at the damaged area 60 in the shaped object 50 in which one part is thinned. In the figures, the view on the left side shows one example of the shaped object 50 before the damage occurs. The view on the right side shows one example of the shaped object 50 in a state where the damage occurred at the damaged area 60.

When such damage occurs in the shaped object 50, for example, consideration is made to connect the damaged area with an adhesive, and the like when repairing through a simple method. However, in this case, it can be considered that the damage is likely to occur again as the strength of the repaired position (the damaged area 60 after repair) decreases. In addition, for example, the strength after the repair can be increased by not simply adhering the adhering area with an adhesive but by reinforcing with an adhesive tape or the like in a state where the damaged area 60 is connected. However, in this case, the appearance of the shaped object 50 is degraded as one part of the surface of the shaped object 50 is covered with the adhesive tape or the like. In particular, in a case where the colored shaped object 50 is repaired, the designability may be greatly deteriorated if the colored area is covered with an adhesive tape or the like.

On the other hand, in the present example, for example, a thin film-shaped repair patch 300 as shown in FIG. 2C is created by the shaping device 12, and the shaped object 50 is repaired using the repair patch 300, so that degradation in appearance after the repair is suppressed while suppressing decrease in strength at the repair position. FIG. 2C illustrates an example of a configuration of the repair patch 300. In the present example, the repair patch 300 is a patch-shaped member (repair patch), which is an example of an attachment member, and is attached to the shaped object 50 when repairing the shaped object 50. Furthermore, the repair patch 300 is formed by being colored in accordance with the color of the portion covered by the repair patch 300 at the time of repair in the shaped object 50. When configured in such manner, for example, the strength at the repair position can be appropriately increased by attaching the repair patch 300 to the shaped object 50 to repair the shaped object 50. Furthermore, by using the repair patch 300 colored in accordance with the color of the shaped object 50, for example, the repair patch 300 can be made less noticeable, and degradation in appearance after repair can be appropriately suppressed. Thus, according to the present example, for example, the shaped object 50 can be more appropriately repaired.

Coloring the repair patch 300 in accordance with the color of the portion covered by the repair patch 300 at the time of repair in the shaped object 50 can be considered as, for example, coloring the repair patch 300 in accordance with the color, pattern, and the like of the surface of the shaped object 50 at the relevant portion. Furthermore, in FIG. 2B, an example of a shaped object 50 having a relatively simple shape is shown for the sake of convenience of illustration. As the shaped object 50 to be actually repaired, a shaped object 50 having a more complicated shape can be used. For example, it is also conceivable to use a shaped object such as a human-shaped figure indicating a person as the shaped object 50. In this case, for example, the limbs, fingers, and the like of the figure can be considered as thin portions or the like that are likely to be damaged. Furthermore, more specifically, it is conceivable to execute the repair of the shaped object 50 carried out using the repair patch 300, for example, as shown in FIGS. 3A to 3D.

Figure 3A:
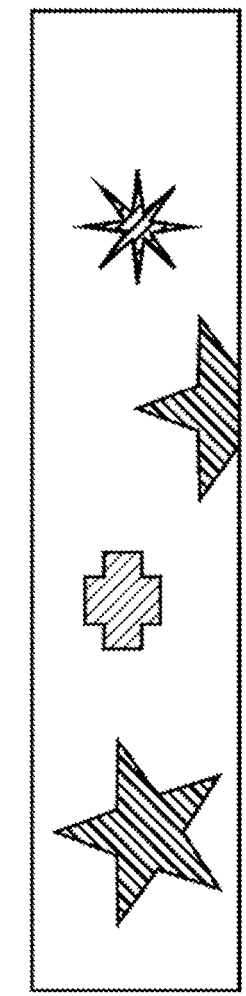
FIGS. 3A to 3D are views describing the operation of repairing the shaped object 50 using the repair patch 300 in more detail.
Figure 3B:
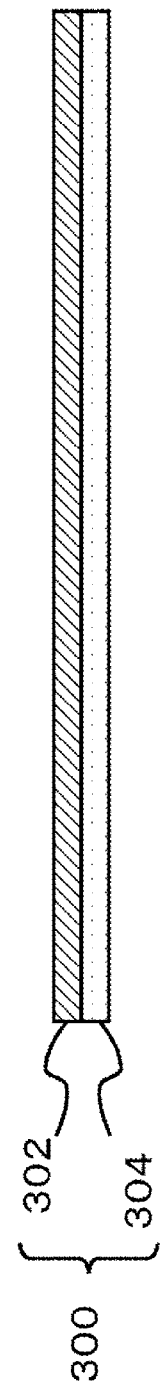

FIGS. 3A to 3D are views describing the operation of repairing the shaped object 50 using the repair patch 300 in more detail. FIGS. 3A and 3B illustrate an example of a configuration of the repair patch 300.

FIG. 3A illustrates an example of a state of the surface of the repair patch 300. FIG. 3B is a cross-sectional view showing an example of a configuration of the repair patch 300. As described above, in the present example, the repair patch 300 is created using the shaping device 12 (see FIGS. 1A to 1C) in the shaping system 10. Therefore, the repair patch 300 can also be considered as, for example, a thin film-shaped shaped object or the like configured by a few number of layers of ink.

In the present example, the repair patch 300 is a flexible film-like body including the colored layer 302 and the adhesive layer 304. In this case, the colored layer 302 is a layer to be colored in the repair patch 300. Furthermore, as described above, in the present example, the repair patch 300 is colored in accordance with the color of the portion covered by the repair patch 300 at the time of repair in the shaped object 50. In this case, it can be considered that the colored layer 302 in the repair patch 300 is colored in this manner. Furthermore, in the present example, the coloring on the colored layer 302 is carried out same as or similar to the coloring on the surface of the shaped object 50. More specifically, for the coloring on the surface of the shaped object 50, for example, consideration is made to carry out the coloring so as to draw characters, patterns, and the like by differing the color according to the position on the surface. In this case, for example, as shown in FIG. 3A, the formation of the colored layer 302 is carried out by coloring so as to draw characters, patterns, and the like adapted to the characters and patterns on the surface of the shaped object 50 according to the color of the portion covered by the repair patch 300 in the shaped object 50 to be repaired. In this case, the clear ink is used to compensate for the change in the amount of ink for coloring caused by the difference in color also even at the time of forming the colored layer 302 of the repair patch 300, similarly to the time of forming the region to be colored 154 (see FIGS. 2A to 2C) in the shaped object 50. Therefore, the colored layer 302 of the repair patch 300 can also be considered to be formed by further using, for example, the clear ink in addition to the colored ink (color ink) for coloring. According to such configuration, for example, the colored layer 302 of the repair patch 300 can be formed by being colored similarly to the region to be colored 154 of the shaped object 50.

The adhesive layer 304 is a layer for adhering the repair patch 300 with respect to the shaped object 50. Furthermore, in the present example, the adhesive layer 304 is a layer that has adhesiveness at least at the time of attaching the repair patch 300 to the shaped object 50. The manner of forming such an adhesive layer 304 will be described in more detail later. Furthermore, in the present example, the adhesive layer 304 is a white layer formed using a white ink ejected from the inkjet head 202$w$ (see FIGS. 1A to 1C). In this case, the adhesive layer 304 can be considered to also serve as, for example, a light reflective layer that reflects light entering from the outside through the colored layer 302. Furthermore, for example, various colors can be more appropriately represented in the colored layer 302 by forming such an adhesive layer 304. In addition, by covering the surface of the shaped object 50 with the white adhesive layer 304, for example, characters and patterns on the surface of the shaped object 50 can be prevented from being transparent and visually recognized through the repair patch 300. Thus, for example, the characters and patterns on the surface of the shaped object 50 and the characters and patterns drawn on the colored layer 302 of the repair patch 300 can be appropriately prevented from being doubly visually recognized.

Furthermore, in the present example, when creating the repair patch 300 in the shaping device 12, the colored layer 302 is formed first, and the adhesive layer 304 is formed thereon. According to such configuration, for example, the adhesive layer 304 having adhesiveness can be appropriately prevented from attaching to the shaping table 104 (see FIGS. 1A to 1C) in the shaping device 12, and the like. Furthermore, in the present example, the repair patch 300 can also be considered as being shaped through the layered shaping method by the shaping device 12. In this case, each of the colored layer 302 and the adhesive layer 304 can be considered to be formed with a layer of ink. Furthermore, the colored layer 302 and the adhesive layer 304 being created by the shaping device 12 can be considered to, for example, overlap in the layering direction in which the material of shaping overlaps in the layered shaping method. Moreover, the colored layer 302 and the adhesive layer 304 may be formed of a plurality of layers of ink overlapping in the layering direction. The thickness of the colored layer 302 in the repair patch 300 is preferably about the same as the thickness of the region to be colored 154 (see FIGS. 2A to 2C) in the shaped object 50. In this case, the thickness of the region to be colored 154 in the shaped object 50 can be considered as, for example, a thickness in a normal direction orthogonal to the surface of the shaped object 50. More specifically, the thickness of the colored layer 302 in the repair patch 300 may be considered as, for example, about 0.5 to 2 times, preferably about 0.7 to 1.5 times the thickness of the region to be colored 154 in the shaped object 50. According to such configuration, for example, in the colored layer 302 of the repair patch 300, the color expression at the quality adapted to the region to be colored 154 in the shaped object 50 can be appropriately carried out.

Figure 3C:
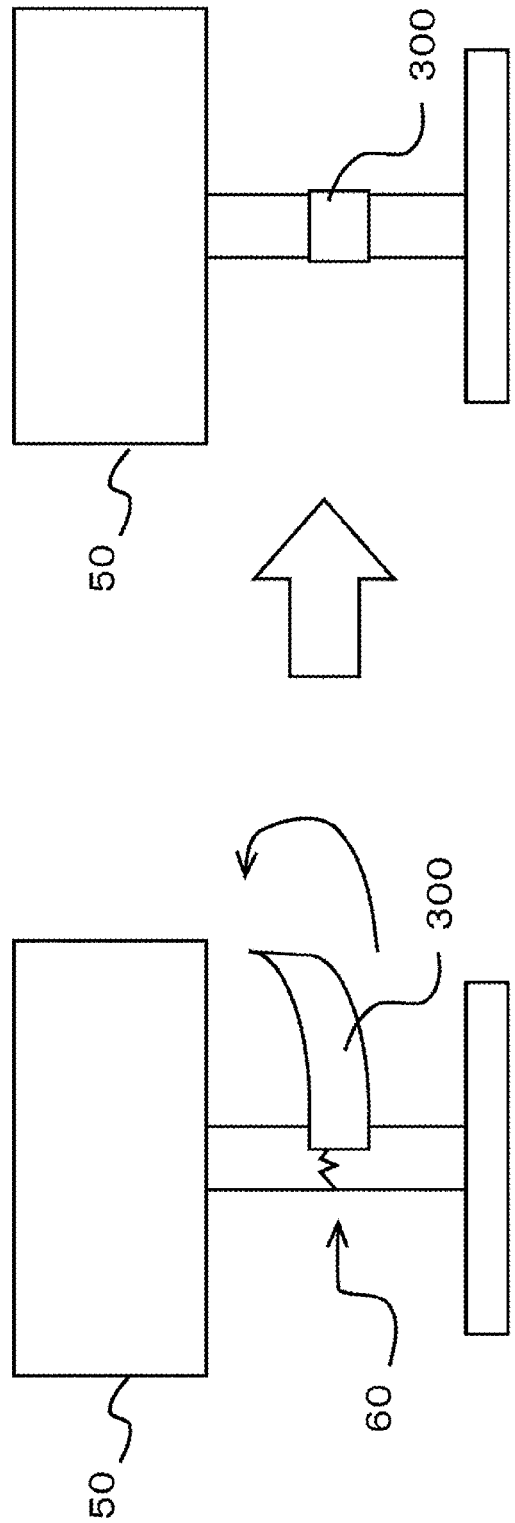
Figure 3D:
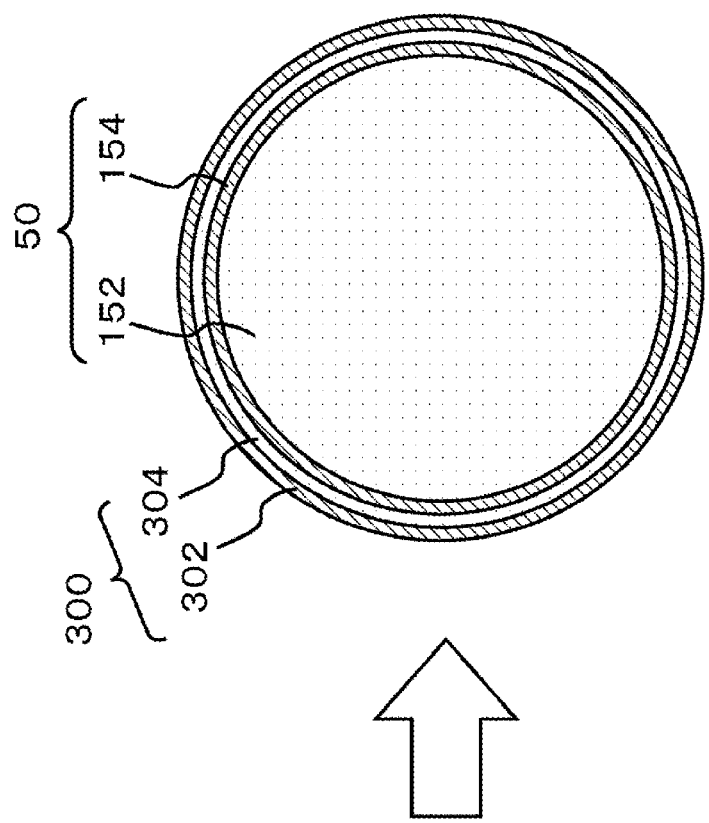
Figure 3D:
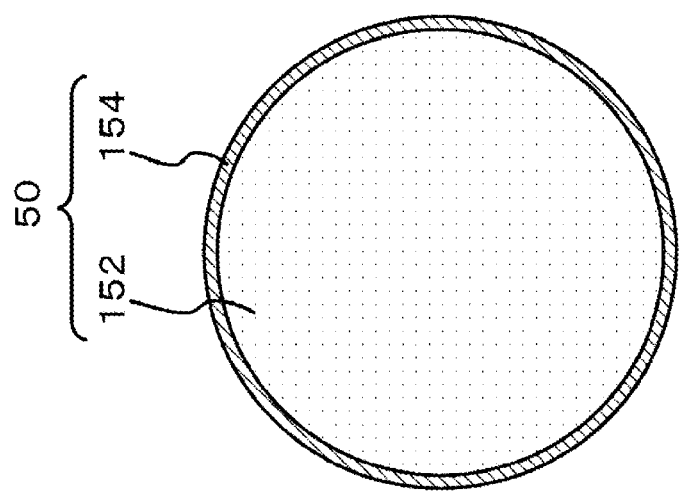

Furthermore, when repairing the shaped object 50 using such a repair patch 300, for example, it is conceivable to attach the repair patch 300 as illustrated in FIGS. 3C and 3D. FIG. 3C shows an example of a manner of attaching the repair patch 300 to the shaped object 50 to be repaired. In FIG. 3C, the view on the left side shows the shaped object 50 to be repaired and the repair patch 300 at the time point when the attachment of the repair patch 300 is started. The view on the right side shows the shaped object 50 to be repaired and the repair patch 300 at the time point when the attachment of the repair patch 300 is completed.

In the illustrated case, the shaped object 50 is damaged so that the thin portion is broken and divided into two. In this case, focusing on one of the divided shaped objects 50, for example, it can be considered that a damage in which one part is defected has occurred. Furthermore, one of the divided shaped objects 50 can be considered as, for example, a shaped object to be repaired. In this case, the other of the divided shaped objects 50 can be considered as, for example, corresponding to a member to be attached to a defective area in the shaped object to be repaired. Furthermore, from such a viewpoint, hereinafter, at least one part of the portion used for repair in the shaped object 50 where the damage in which one part is defected has occurred is referred to as a repair target shaped object. The repair target shaped object can be considered as, for example, a configuration corresponding to at least one part of the shaped object 50 of before the damage occurs. Furthermore, a member to be attached to a defective area in the repair target shaped object is referred to as a defective portion part. In this case, for example, a portion excluding the defective portion part from the shaped object before the damage can be considered as a repair target shaped object.

More specifically, when the damage as illustrated has occurred, one of the shaped objects 50 divided into two as described above can be considered as an example of the repair target shaped object. Furthermore, the other of the divided shaped objects 50 can be considered as an example of a defective portion part. Furthermore, in this case, for example, a portion deviated from the correction target shaped object due to damage can be considered as a defective portion part. By using such a defective portion part, for example, the defective portion part can be easily and appropriately prepared. Furthermore, depending on the state of damage, the quality required for repair, and the like, consideration is made to use a part newly created for repair instead of one part of the shaped object 50 before the damage occurred as the defective portion part. For example, depending on the manner the shaped object 50 is damaged, it may be difficult to use one part of the original shaped object 50 as the defective portion part. In such a case, the defective portion part is newly created (shaped) using, for example, the shaping device 12 (see FIGS. 1A to 1C) used to create the repair patch 300.

As shown in FIG. 3C, in the present example, when repairing the shaped object 50, the divided shaped objects 50 are connected at the position of the damaged area 60, and the repair patch 300 is attached thereon. Such an operation can be considered as, for example, an operation of attaching the defective portion part to the repair target shaped object and covering at least one part of the boundary portion with the repair patch 300, and the like. Furthermore, the manner of attaching the repair patch 300 can be considered as, for example, being attached to at least one part of the surfaces of the repair target shaped object and the defective portion part. In addition, the adhesive layer 304 in the repair patch 300 can be considered to function as, for example, a layer for adhering the repair patch 300 to the repair target shaped object and the defective portion part. Moreover, in this case, the other is preferably adhered to one of the divided shaped objects 50 using an adhesive before attaching the repair patch 300. According to such configuration, for example, the strength of the shaped object 50 after the repair can be more appropriately enhanced.

In this case, the state of the cross-section of the shaped object 50 changes, for example, as shown in FIG. 3D between before and after attaching the repair patch 300. FIG. 3D is a cross-sectional view showing an example of a configuration of a cross-section of the shaped object 50 and the repair patch 300 at a position of attaching the repair patch 300. In FIG. 3D, the view on the left side shows a cross-section of the shaped object 50 at a time point before attaching the repair patch 300 after attaching the other to one of the divided shaped objects 50. In this case, the cross-section of the shaped object 50 has a configuration in which the region to be colored 154 surrounds the periphery of the light reflecting region 152 in the same manner as the shaped object 50 before the damage occurs. Furthermore, in FIG. 3D, the view on the right side shows the cross-section of the shaped object 50 and the repair patch 300 after the other is attached to one of the divided shaped objects 50 and then the repair patch 300 is further attached.

In this case, as shown in the figure, the adhesive layer 304 and the colored layer 302 in the repair patch 300 overlap the outer side of the region to be colored 154 in the shaped object 50 in this order at the position where the repair patch 300 is attached.

Furthermore, as described above, in the present example, the adhesive layer 304 in the repair patch 300 is formed to also serve as the light reflective layer using the white ink. In this case, at the position where the repair patch 300 is attached, the color of the region to be colored 154 of the shaped object 50 is concealed by the adhesive layer 304 in the repair patch 300 and is not visually recognized from the outside. Therefore, the adhesive layer 304 in the repair patch 300 can also be considered to function as, for example, a concealing layer that conceals the color of the surface of the shaped object 50. Furthermore, in this case, in the repair patch 300, the color colored on the colored layer 302 can be considered to become, for example, the color of the shaped object 50 after the repair as the colored layer 302 comes on the outer side of the adhesive layer 304. As described above, in the present example, the colored layer 302 in the repair patch 300 is formed with a color that matches the color of the portion covered by the repair patch 300 at the time of repair in the shaped object 50. Thus, according to such configuration, for example, the color of the shaped object 50 after the repair at the position of attaching the repair patch 300 can be the same color as before the repair. Thus, for example, the repair of the shaped object 50 using the repair patch 300 can be appropriately performed while appropriately preventing the deterioration in the appearance of the shaped object 50 after the repair by attaching the repair patch 300.

Figure 4:
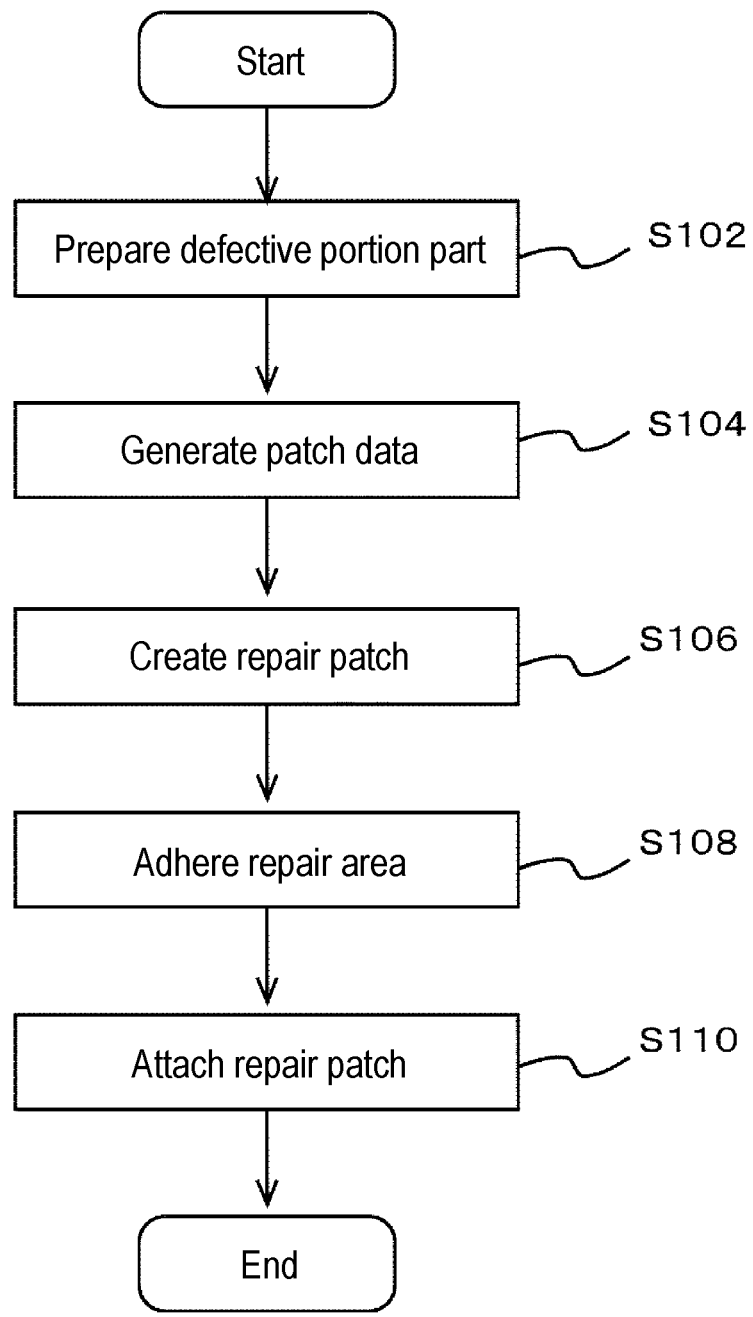
FIG. 4 is a flow chart showing an example of an operation of repairing the shaped object 50.

Next, the operation of repairing the shaped object 50 will be described in more detail. FIG. 4 is a flowchart showing an example of the operation of repairing the shaped object 50, and shows an example of the operation of repairing the shaped object 50 in which the damage where one part is defected has occurred. Furthermore, hereinafter, the shaped object 50 to be repaired will be appropriately referred to as a repair target shaped object and described. In this case, as described above, the repair target shaped object can be considered as, for example, at least one part of the damaged shaped object 50, and the like. Furthermore, in the present example, this repair operation is an example of an operation of a repairing method for the shaped object 50 of repairing the shaped object 50 shaped by the shaping device 12.

In the present example, in the operation of repairing the repair target shaped object, first, a defective portion part to be attached to the repair target shaped object is prepared (S102). The operation in step S102 is an example of the operation in the preparing stage. Furthermore, as described above, it is conceivable to use one part of the shaped object 50 before damage as the defective portion part. In this case, for example, a portion separated from the shaped object 50 due to damage can be considered as a defective portion part. Furthermore, in the present example, in step S102, each part of the shaped object 50 separated by the damage is collected, a part thereof is treated as a repair target shaped object, and the other part is treated as a defective portion part to prepare a defective portion part. Moreover, as described above, depending on the manner in which the shaped object 50 is damaged, consideration is made to newly shape the defective portion part using the shaping device 12 without using one part of the original shaped object 50 as the defective portion part. In this case, for example, the operation of shaping the defective portion part can be considered as an operation of preparing the defective portion part, and the like.

Furthermore, after preparing the defective portion part, patch data that is data indicating the repair patch 300 is generated (S104), and the shaping device 12 is caused to perform the shaping operation based on the patch data, so that the shaping device 12 is caused to create the repair patch 300 (S106). The operations in steps S104 and S106 are an example of the operation in the attachment member creating stage. In step S104 of the present example, the control PC 14 in the shaping system 10 is caused to generate the patch data. The operation of generating the slice data will be described in more detail later. In step S106, the control PC 14 is caused to provide the patch data to the shaping device 12 to cause the shaping device 12 to perform the shaping operation based on the patch data.

Here, causing the shaping device 12 to create the repair patch 300 can be considered as, for example, creating the repair patch 300 using the shaping device 12 capable of shaping a shaped object colored by the layered shaping method. In addition, as described above, in the present example, the repair patch 300 includes the colored layer 302 and the adhesive layer 304. Among these layers, the adhesive layer 304 can be considered as, for example, a layer having different properties from the layer of ink formed at the time of normal shaping in the shaping device 12. More specifically, as described above, in the shaping device 12 of the present example, an ultraviolet-curable ink is used as a shaping material. In this case, for example, the ultraviolet-curable ink can be brought to a state having adhesiveness by being irradiated with the ultraviolet light of a smaller amount of light than when being completely cured. Therefore, in the present example, the adhesive layer 304 of the repair patch 300 is formed by bringing the ultraviolet-curable ink into such an adhesive state. Furthermore, in the present example, in step S106, the colored layer 302 and the adhesive layer 304 in the repair patch 300 are formed using the ink ejected from any of the plurality of inkjet heads 202 in the shaping device 12, as described above. In this case, the colored layer 302 is formed by irradiating a sufficient amount of ultraviolet light from the ultraviolet light source 204 in the shaping device 12 and curing the ink to a state not having adhesiveness. On the other hand, when forming the adhesive layer 304 to be formed on the colored layer 302, the white ink to be used for forming the adhesive layer 304 is not completely cured, but the viscosity is increased to a state having adhesiveness by irradiating the ultraviolet light of a smaller amount of light than that at the time of forming the colored layer 302 from the ultraviolet light source 204. According to such configuration, for example, the adhesive layer 304 having adhesiveness can be appropriately formed using the ultraviolet-curable ink, which is the shaping material used at the time of shaping the normal shaped object in the shaping device 12. The state in which the ultraviolet-curable ink is not completely cured and the viscosity thereof is increased to a state having adhesiveness can be considered as, for example, a state in which the ink is semi-cured (precured).

In addition, after creating the repair patch 300, the defective portion part is adhered to the repair target shaped object using the known adhesive to attach the defective portion part to the repair target shaped object (S108). The operation in step S108 is an example of the operation in the adhering stage.

Furthermore, in the present example, the repair patch 300 is further attached so as to cover at least one part of the boundary portion between the repair target shaped object and the defective portion part while the repair target shaped object and the defective portion part are brought into contact with each other by adhesion (S110). The operation in step S110 is an example of the operation in the attaching stage. Furthermore, as described above, in the present example, the adhesive layer 304 in the repair patch 300 is formed in a state where the ultraviolet-curable ink is not completely cured. Therefore, in the present example, in step S110, after attaching the repair patch 300 to the repair target shaped object, the repair patch 300 is further irradiated with ultraviolet light to cure the ultraviolet-curable ink in the adhesive layer 304. Thus, for example, the curing of the ultraviolet-curable ink used for forming the adhesive layer 304 is completed, and the repair patch 300 is fixed to the repair target shaped object. According to such configuration, for example, the repair patch 300 can be more appropriately attached to the repair target shaped object. Thus, for example, the repair of the repair target shaped object can be appropriately carried out.

Next, the operation of generating patch data in step S104 will be described in more detail. As described above, in the present example, the repair patch 300 is colored in accordance with the color of the portion covered by the repair patch 300 at the time of repair in the repair target shaped object and the defective portion part, and formed. Furthermore, in this case, it is conceivable to create the shape of the repair patch 300 according to the shape of the repair target shaped object and the shape of the defective portion part. Therefore, in the present example, such a repair patch 300 is created by creating the repair patch 300 based on the data used at the time of shaping the repair target shaped object. In this case, the time of shaping the repair target shaped object can be considered as, for example, the time of shaping the shaped object 50 before the damage occurs by the shaping device 12. Furthermore, in the present example, shaped object data used in the shaping device 12 is used as such data. In this case, the shaped object data can be considered as, for example, data indicating the shape and color at the time of shaping the shaped object 50 to be repaired. The shaped object data can also be considered as, for example, 3D data indicating the entire shaped object 50 to be repaired. In the present example, the patch data is generated by the operation shown in FIG. 5 by the control PC 14 in the shaping system 10 based on the shaped object data used at the time of shaping the repair target shaped object.

Figure 5:
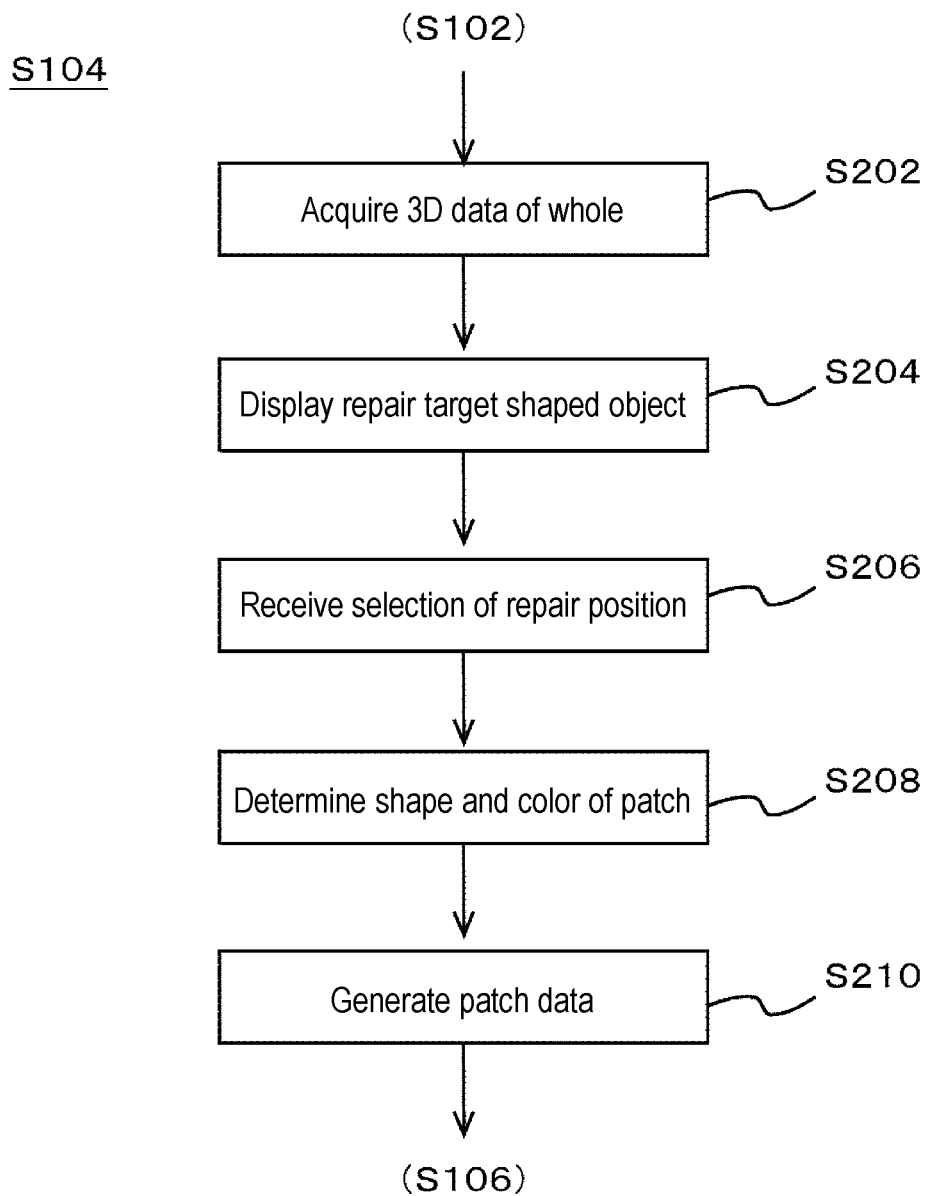
FIG. 5 is a flowchart showing an example of an operation of generating patch data.

FIG. 5 is a flowchart illustrating an example of an operation of generating the patch data. In the operation shown in the flowchart, first, 3D data indicating the entire shaped object 50 is acquired (S202). More specifically, in step S202 of the present example, the control PC 14 acquires the shaped object data used at the time of shaping the repair target shaped object as 3D data indicating the entire shaped object 50 according to a user's instruction or the like. Then, the control PC 14 displays an image showing at least one part of the repair target shaped object on the display unit 22 based on the acquired shaped object data (S204). The operation of step S204 is an example of an operation of indicating the repair target shaped object to the user.

In this case, for example, it is conceivable to display the entire shaped object 50 to be the repair target shaped object on the display unit 22. Furthermore, for example, one part of the shaped object 50 may be displayed on the display unit 22 in an enlarged manner according to an instruction of the user. Moreover, in the present example, in step S204, it can be considered that the shaped object 50 before the damage occurs is displayed as the repair target shaped object to be displayed on the display unit 22.

Furthermore, in the present example, a position to be repaired due to occurrence of damage is determined according to an instruction of a user. Therefore, after displaying the shaped object 50 on the display unit 22 in step S204, for example, the control PC 14 receives designation (selection) of a repair position, which is a position to be repaired in the repair target shaped object, from the user according to the user's operation on the operation unit 24 (S206). The operation in step S206 is an example of the operation in the repair position designating stage. The operation of step S206 can be considered as, for example, an operation of displaying an image showing at least one part of the repair target shaped object on the image display device and receiving the designation of the repair position from the user. With this configuration, for example, the repair position corresponding to the repair patch 300 to be created can be appropriately determined. After receiving the designation of the repair position, the control PC 14 determines the shape of the repair patch 300 and the color of each position in the colored layer 302 of the repair patch 300 in accordance with the designated repair position (S208). Then, the control PC 14 generates shaped object data for the repair patch 300 as patch data indicating the repair patch 300 to be created based on the determined shape and color (S210). In this case, the shaped object data generated in step S210 can also be considered as, for example, 3D data indicating the shape and color of the repair patch 300.

According to such configuration, for example, the color, shape, and the like of the portion covered by the repair patch 300 in the repair target shaped object can be appropriately acquired based on the shaped object data indicating the shaped object 50. In addition, for example, the repair position can be appropriately determined by receiving the designation of the repair position by the user. Thus, for example, the shape and color of the repair patch 300 adapted to the repair position of the shaped object 50 can be appropriately determined. Thus, according to the present example, for example, the colored layer 302 of the repair patch 300 can be appropriately colored in accordance with the color of the portion covered by the repair patch 300 in the shaped object 50 to be repaired. Furthermore, in the present example, the control PC 14 provides the shaped object data for the repair patch 300 to the shaping device 12 to cause the shaping device 12 to create the repair patch 300 based on the shape and color determined in step S208. According to such configuration, for example, the repair patch 300 corresponding to the shape and color of the shaped object 50 and the repair position can be appropriately created.

The operation of creating the patch data is not limited to the operation described above, and various changes can be made. For example, in the operation described above with reference to FIG. 5, the control PC 14 generates the patch data indicating the repair patch 300 based on the shaped object data used at the time of shaping the repair target shaped object. However, in a modified example of the operation of generating the patch data, the patch data may be generated without using such shaped object data. In this case, for example, it is conceivable to directly acquire the shape and color of the repair target shaped object by performing 3D scanning on the damaged shaped object 50 to be repaired. More specifically, in this case, in step S202 in the operation shown in FIG. 5, scan data, which is data obtained by 3D scanning the damaged shaped object 50, is generated as data indicating the shape and color of the repair target shaped object. In this case, the operation of step S202 can be considered as, for example, an example of the operation in the data generating stage. In this case, the patch data is generated based on the scan data by performing the operations of step S204 and thereafter using the scan data instead of the shaped object data indicating the shaped object 50 before the damage. Even when configured in such manner, for example, the shape of the repair patch 300 and the color of each position of the colored layer 302 of the repair patch 300 can be appropriately determined based on the scan data. Furthermore, the repair patch 300 adapted to the shape and color of the shaped object 50 and the repair position can be appropriately created based on the determined shape and color.

In addition, when the patch data is generated based on the scan data, it is preferable that a portion corresponding to the defective portion part described above is also a target of the scan.

More specifically, in this case, for example, consideration is made to perform the 3D scan with the defective portion part attached to the repair target shaped object corresponding to one part of the shaped object 50. According to such configuration, for example, the shape and color of the portion covered by the repair patch 300 in the repair target shaped object and the defective portion part can be appropriately acquired. Thus, for example, the shape of the repair patch 300 and the color of each position of the colored layer 302 can be more appropriately determined. Furthermore, in this case, for example, it is conceivable to perform the 3D scan in a state where the defective portion part is temporarily fixed to the repair target shaped object. As a method of 3D scan, for example, it is conceivable to use various known methods. Furthermore, in this case, for example, it is conceivable to perform 3D scanning or the like using a plurality of photographs captured from directions different from each other using a smartphone or the like. According to such configuration, for example, the 3D scan can be easily executed without using a dedicated expensive device or the like. The patch data may be generated by a computer other than, for example, the control PC 14. In this case, the control PC 14 causes the shaping device 12 to create the repair patch 300 by providing the patch data received from the outside to the shaping device 12.

Furthermore, in the operation of creating the patch data, for example, consideration is also made to determine the repair position based on the shaped object data indicating the shaped object 50 before damage and the state of the damaged shaped object 50. More specifically, in this case, it is conceivable to detect the position where the damage has occurred (damaged position) based on the shaped object data used at the time of shaping the shaped object 50 to be repaired and the image (e.g., photograph etc.) indicating the damaged shaped object 50. In this case, a computer (e.g., the control PC 14) that executes an operation of creating the patch data determines, for example, a candidate for a repair position based on a detected damaged position, and displays the candidate on the display unit 22. Then, an instruction to change or correct the repair position is received from the user as necessary, and the repair position is determined based on the received instruction. With this configuration, for example, the repair position can be more easily and appropriately determined.

Figure 6A:
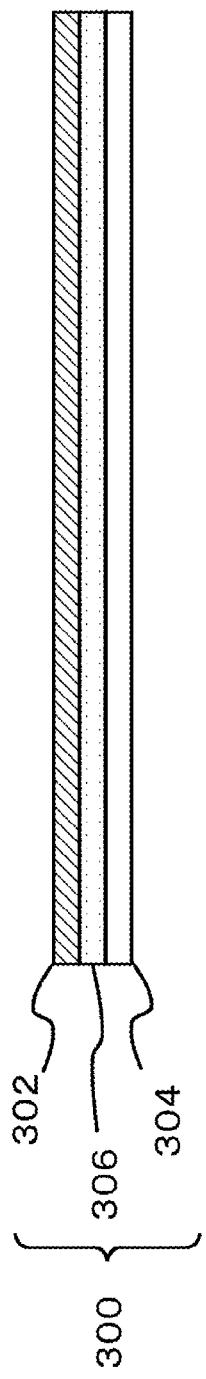
FIGS. 6A to 6C are views describing a modified example of the configuration and the like of the repair patch 300.
Figure 6B:
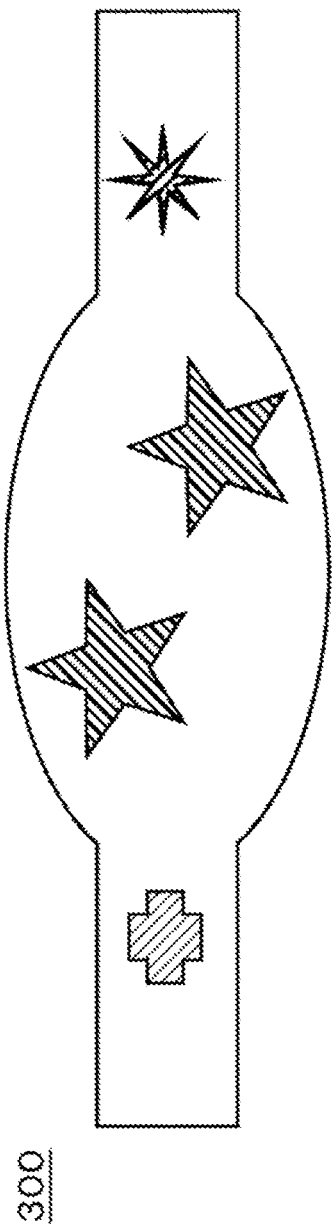
Figure 6C:
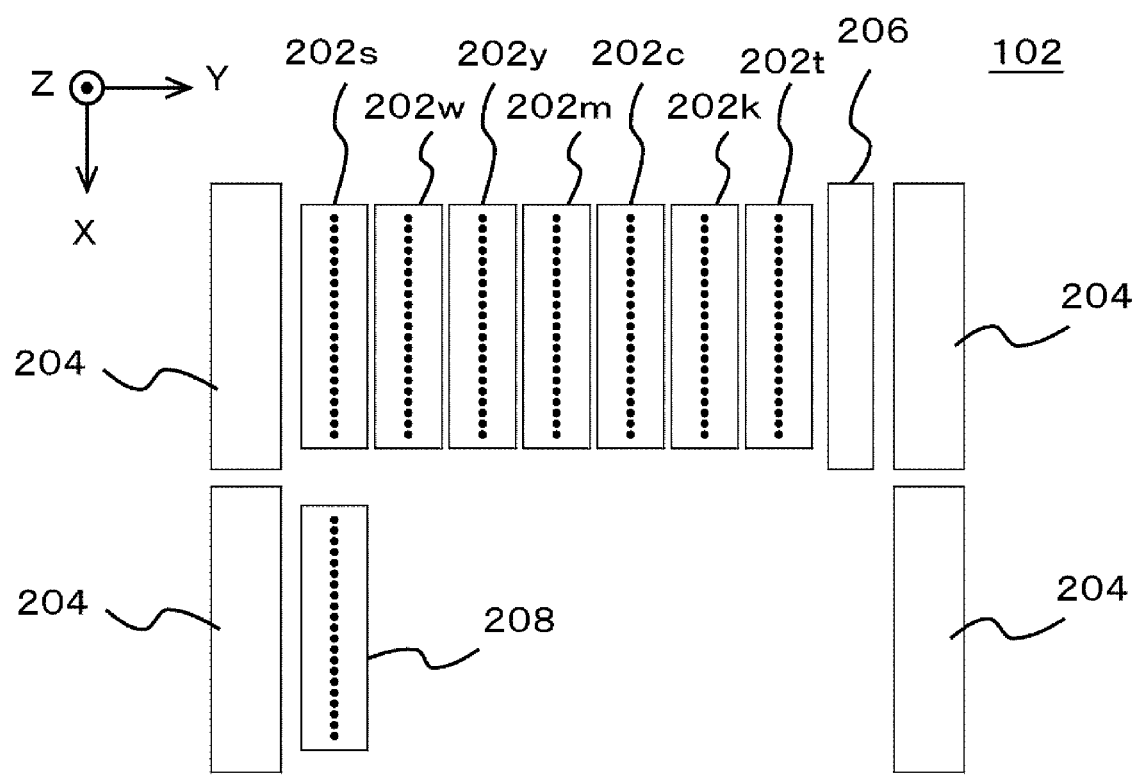

The configuration and the like of the repair patch 300 are not limited to the configuration described above, and can be variously changed. FIGS. 6A to 6C are views describing a modified example of the configuration and the like of the repair patch 300. FIGS. 6A and 6B illustrate a modified example of the configuration of the repair patch 300. Other than the points described below, in FIGS. 6A to 6C, the configurations denoted with the same reference numbers as FIGS. 1A to 5 may have features same as or similar to the configurations in FIGS. 1A to 5. In the above description, the configuration in which the adhesive layer 304 in the repair patch 300 is formed using the white ink to cause the adhesive layer 304 to also serve as the light reflective layer has been mainly described for the configuration of the repair patch 300. However, in a modified example of the configuration of the repair patch 300, the adhesive layer 304 of the repair patch 300 may be formed in a color other than white using an ink other than white. In this case, for example, it is conceivable to form a colorless transparent adhesive layer 304 using clear ink. In this case, for example, as shown in FIG. 6A, it is conceivable to create the repair patch 300 having a configuration of further including a light reflective layer 306 in addition to the colored layer 302 and the adhesive layer 304. More specifically, in this case, it is conceivable to form the white light reflective layer 306 using a white ink between the colored layer 302 and the adhesive layer 304. In this case, it is conceivable that only the adhesive layer 304 among the layers in the repair patch 300 is formed to have adhesiveness, and the colored layer 302 and the light reflective layer 306 are irradiated with a sufficient amount of ultraviolet light to be formed in a state having no adhesiveness. Even when configured in such manner, the colored repair patch 300 can be appropriately created similarly to the shaped object 50.

In addition, in FIGS. 1A to 5, an example of a simple shape is illustrated for the shape of the repair patch 300 for the sake of convenience of illustration. However, as described above, consideration is made to have the shape of the repair patch 300 adapted to the repair position in the shaped object 50. Therefore, as for the shape of the repair patch 300, for example, it is conceivable to adopt various shapes adapted to the repair position, such as the shape illustrated in FIG. 6B. In this case, it is also conceivable to create the repair patch 300 having a more complicated shape as necessary.

Furthermore, in the above description, the manner of forming the adhesive layer 304 in the repair patch 300 has been mainly described for a method of forming using an ultraviolet-curable ink used as a shaping material at the time of shaping a normal shaped object. However, in a modified example of the manner of forming the adhesive layer 304, for example, consideration is also made to form the adhesive layer 304 with an adhesive material that is not used as a shaping material at the time of shaping a normal shaped object. In this case, the material not used as the shaping material at the time of shaping the normal shaped object can be considered as, for example, a material not used when shaping the same shaped object as the repair target shaped object. More specifically, the adhesive material is, for example, a material of the adhesive layer 304 in the repair patch 300, and can be considered as a material not used when forming the same region as the light reflecting region 152 and the region to be colored 154 (see FIGS. 2A to 2C) in the shaped object 50 to be repaired. Furthermore, in this case, it is conceivable to create the repair patch 300 using the shaping device 12 having a configuration capable of further ejecting the adhesive material in addition to the shaping material used at the time of shaping the normal shaped object. More specifically, in this case, for example, it is conceivable to create the repair patch 300 using the shaping device 12 including the head unit 102 having the configuration illustrated in FIG. 6C. FIG. 6C shows a modified example of the configuration of the head unit 102 in the shaping device 12 (see FIGS. 1A to 1C). In the present modified example, the head unit 102 further includes an inkjet head 208 in addition to the inkjet heads 202s to 202t in the head unit 102 having the configuration shown in FIG. 1C as the plurality of inkjet heads. Furthermore, the ultraviolet light source 204 for the inkjet head 208 is further provided on one side and the other side in the main scanning direction with respect to the inkjet head 208. In this case, the shaping device 12 can be considered as, for example, a configuration of performing shaping without using the inkjet head 208 when shaping a shaped object same as or similar to the shaped object 50 to be repaired, and using the inkjet head 208 when creating the repair patch 300.

Furthermore, in the present modified example, the inkjet head 208 is an example of an adhesive material head that ejects an adhesive material used as a material of the adhesive layer 304. As the repair patch 300, for example, it is conceivable to form the repair patch 300 having a configuration in which the light reflective layer 306 and the adhesive layer 304 are separated as in the configuration illustrated in FIGS. 6A to 6C. More specifically, at the time of forming the repair patch 300, the shaping device 12 forms the colored layer 302 using, for example, the colored ink ejected from the inkjet heads 202y to 202k and the clear ink ejected from the inkjet head 202t. In addition, the light reflective layer 306 is formed on the colored layer 302 using the white ink ejected from the inkjet head 202w. Then, the adhesive layer 304 is formed on the light reflective layer 306 using the adhesive material ejected from the inkjet head 208. Even when configured in such manner, for example, the repair patch 300 used for repairing the shaped object 50 can be appropriately created.

In the present modified example, consideration is made to use, for example, an ink that fixes in a state having adhesiveness at the ejection position as the adhesive material ejected from the inkjet head 208. As such an adhesive material, for example, it is conceivable to use an ultraviolet-curable ink or the like that maintains adhesiveness even when ultraviolet light is sufficiently emitted and curing is completed. More specifically, as such an adhesive material, for example, it is conceivable to use a liquid same as or similar to a known ultraviolet-curable ink (primer ink) for forming a base. As such a primer ink, for example, it is conceivable to use a known primer ink (e.g., PR-200 type ink etc.) sold by MIMAKI ENGINEERING CO., LTD. In addition, when using the repair patch 300 including such an adhesive layer 304, it can be considered that the adhesive layer 304 at the time point when the creation of the repair patch 300 is completed is not in a semi-cured state or the like but in a state in which curing is completed. Therefore, in this case, consideration is made to complete the attachment of the repair patch 300 to the repair target shaped object without further irradiating the ultraviolet light at the time of repairing the shaped object. Even when configured in such manner, for example, the repair patch 300 can be appropriately attached to the repair target shaped object. In a further modified example of the configuration of the shaping device 12, for example, consideration is made to use an adhesive material that is not ultraviolet-curable, and the like as the adhesive material that is not used as the shaping material at the time of shaping the normal shaped object.

Next, supplementary description regarding each configuration described above will be made. In addition, hereinafter, various modified examples are included and referred to as a configuration of the present example, for the sake of convenience of description. As described above, in the present example, the shaped object is repaired using at least one part of the damaged shaped object as the shaped object to be repaired. In this case, for example, the strength of the shaped object after the repair can be appropriately enhanced by attaching the repair patch 300 created using the shaping device 12 to at least one part of the repair position in the shaped object. Furthermore, by using the repair patch 300 including at least the colored layer 302 and the adhesive layer 304, for example, the shaping device 12 can easily and appropriately create the repair patch 300 that is appropriately colored and can be adhered to the shaped object. Furthermore, the colored layer 302 of the repair patch 300 is colored and formed in accordance with the color of the portion covered by the repair patch 300 in the shaped object to be repaired, so that, for example, the repair patch 300 can be appropriately prevented from being excessively conspicuous in the shaped object after the repair.

In this regard, if the repair patch 300 is created using the shaping device 12 capable of shaping the shaped object, for example, a new shaped object having the same shape and color as the damaged shaped object may be created instead of repairing using the repair patch 300. However, depending on the intended purpose of the shaped object and the like, it may be more preferable to repair than to create a new shaped object. More specifically, for example, when shaping a new shaped object, it is conceivable that the amount of ink used as the shaping material increases, leading to a large amount of cost. Furthermore, in a case where the shaped object that has been subjected to additional processing and the like after being shaped by the shaping device 12 is damaged, the same shaped object as the damaged shaped object may not be shaped only by performing the shaping in the shaping device 12. On the other hand, according to the present example, the repair of the shaped object can be appropriately carried out at low cost by using the repair patch 300. Furthermore, in this case, the repair of the shaped object carried out in the present example can be considered as, for example, a method particularly suitable when carrying out a simple repair carried out without increasing cost, and the like.

Furthermore, as described above, in the present example, the repair patch 300 is created using the shaping device 12 capable of executing the shaping of the shaped object by the layered shaping method. In this case, for example, it is conceivable to create the repair patch 300 using the shaping device 12 (shaping device of the same machine body) that shaped the shaped object to be repaired. Furthermore, the shaping device 12 used to create the repair patch 300 may be a shaping device 12 different from the machine body that shaped the shaped object to be repaired. In this case, for example, the shaping device 12 of the same model as the machine body that shaped the shaped object or the shaping device 12 of a compatible model is preferably used. According to such configuration, for example, the repair patch 300 colored similarly to the shaped object to be repaired can be more appropriately created. Furthermore, in this case, for example, the thickness of each layer of ink layered in the layered shaping method is preferably the same fat the time of shaping the shaped object and at the time of creating the repair patch 300. According to such configuration, for example, the repair patch 300 colored in accordance with the shaped object can be more appropriately created. Furthermore, depending on the quality required for repair, and the like, the repair patch 300 may be created using the shaping device 12 that is not the same model or compatible model as the shaping device that shaped the shaped object. Even in such a case, the repair of the shaped object can be appropriately carried out by using the repair patch 300 colored in accordance with the surface of the shaped object.

INDUSTRIAL APPLICABILITY

The present disclosure can be suitably used, for example, in a repairing method for a shaped object.

What is claimed is:

1. A repairing method for a shaped object for repairing a shaped object shaped by a shaping device, the repairing method comprising:
   preparing a defective portion part which is a member to be attached to a defective area in a repair target shaped object which is the shaped object where a damage in which one part is defected has occurred;
   creating an attachment member which is a member to be attached to at least one part of surfaces of the repair target shaped object and the defective portion part; and
   attaching the attachment member so as to cover at least one part of a boundary portion between the repair target shaped object and the defective portion part in a state where the repair target shaped object and the defective portion part are brought into contact with each other; wherein
   at least one part of a surface of the repair target shaped object is colored;
   in the step of attaching the attachment member, the attachment member including an adhesive layer and a colored layer is created using a shaping device capable of shaping the shaped object colored by a layered shaping method, wherein the adhesive layer is a layer for adhering the attachment member to the repair target shaped object and the defective portion part, and the colored layer is a layer colored and formed according to a color of a portion of the shaped object to be covered by the attachment member;
   the repair target shaped object includes:
      a region to be colored subjected to coloring at a surface of the repair target shaped object; and
      a light reflecting region formed on an inner side of the region to be colored in a light reflecting manner;
   the shaping device used in the step of attaching the attachment member is a device that ejects an ultraviolet-curable material as a shaping material, and includes:
      a plurality of ejection heads each of which ejects the shaping material, and
      an ultraviolet light source that irradiates the ejected shaping material with ultraviolet light;
   the plurality of ejection heads include at least:
      a coloring material head that ejects a color material which is a colored shaping material for coloring; and a light reflective material head that ejects a light reflective material which is a shaping material having light reflectivity:

in the step of attaching the attachment member, the colored layer is formed using at least the color material ejected from the coloring material head, the adhesive layer is formed using the shaping material ejected from any one of the plurality of ejection heads, and at a time of forming the adhesive layer;

the shaping material is irradiated with ultraviolet light from the ultraviolet light source to increase viscosity of the shaping material to a state having adhesiveness; and after attaching the attachment member to the repair target shaped object, the attachment member is irradiated with ultraviolet light to cure the shaping material in the adhesive layer.

2. The repairing method for the shaped object according to claim 1, further comprising:

receiving a designation of a repair position, which is a position to be repaired in the repair target shaped object, from a user, wherein an image showing at least one part of the repair target shaped object is displayed on an image display device, and the designation of the repair position is received from the user; and wherein in the step of attaching the attachment member, a shape of the attachment member and a color of each position in the colored layer are determined in accordance with the received designation of the repair position, and the attachment member is created based on the determined shape and color.

3. The repairing method for the shaped object according to claim 1, wherein in the step of attaching the attachment member, a color of each position in the colored layer of the attachment member is determined based on shaped object data used at a time of shaping the repair target shaped object, the data indicating the shape and color of the repair target shaped object, and the attachment member is created based on the determined color.

4. The repairing method for the shaped object according to claim 1, further comprising:

generating scan data which is data obtained by 3D scanning the repair target shaped object; wherein in the step of attaching the attachment member, a color of each position in the colored layer of the attachment member is determined based on the generated scan data, and the attachment member is created based on the determined color.

5. A repairing method for a shaped object for repairing a shaped object shaped by a shaping device, the repairing method comprising:

preparing a defective portion part which is a member to be attached to a defective area in a repair target shaped object which is the shaped object where a damage in which one part is defected has occurred;

creating an attachment member which is a member to be attached to at least one part of surfaces of the repair target shaped object and the defective portion part; and attaching the attachment member so as to cover at least one part of a boundary portion between the repair target shaped object and the defective portion part in a state where the repair target shaped object and the defective portion part are brought into contact with each other; wherein at least one part of a surface of the repair target shaped object is colored;

in the step of attaching the attachment member, the attachment member including an adhesive layer and a colored layer is created using a shaping device capable of shaping the shaped object colored by a layered shaping method, wherein the adhesive layer is a layer for adhering the attachment member to the repair target shaped object and the defective portion part, and the colored layer is a layer colored and formed according to a color of a portion of the shaped object to be covered by the attachment member;

the repair target shaped object includes:

a region to be colored subjected to coloring at a surface of the repair target shaped object; and a light reflecting region formed on an inner side of the region to be colored in a light reflecting manner:

the shaping device used in the step of attaching the attachment member includes a plurality of ejection heads each of which ejects the shaping material;

the plurality of ejection heads include at least:

a coloring material head that ejects a color material which is a colored shaping material for coloring, a light reflective material head that ejects a light reflective material which is a shaping material having light reflectivity; and an adhesive material head that ejects an adhesive material, which is a material of the adhesive layer in the attachment member, the adhesive material not being used when forming a same region as each of the region to be colored and the light reflecting region in the repair target shaped object; and in the step of attaching the attachment member, the colored layer is formed using at least the color material ejected from the coloring material head, and the adhesive layer is formed using the adhesive material ejected from the adhesive material head.

* * * * *